(12) United States Patent
Ruckart

(10) Patent No.: US 8,360,248 B2
(45) Date of Patent: Jan. 29, 2013

(54) METHODS AND SYSTEMS TO MANAGE THE VIRAL TRANSFER OF RENTAL MEDIA

(76) Inventor: Perri Ruckart, Atlanta, GA (US)

( * ) Notice: Subject to any disclaimer, the term of this patent is extended or adjusted under 35 U.S.C. 154(b) by 30 days.

(21) Appl. No.: 12/207,878

(22) Filed: Sep. 10, 2008

(65) Prior Publication Data

US 2009/0070437 A1    Mar. 12, 2009

Related U.S. Application Data

(60) Provisional application No. 60/971,320, filed on Sep. 11, 2007.

(51) Int. Cl.
*G06F 15/16* (2006.01)
(52) U.S. Cl. .................... 209/237; 709/218; 709/219
(58) Field of Classification Search .............. 709/219; 705/80
See application file for complete search history.

(56) References Cited

U.S. PATENT DOCUMENTS

| | | | |
|---|---|---|---|
| 6,445,717 B1 * | 9/2002 | Gibson et al. | ................ 370/473 |
| 2004/0172274 A1 | 9/2004 | Gross | |
| 2004/0172275 A1 | 9/2004 | Gross | |
| 2006/0020662 A1 | 1/2006 | Robinson | |
| 2006/0149572 A1 | 7/2006 | Auzins et al. | |
| 2006/0149685 A1 | 7/2006 | Gross | |
| 2006/0195913 A1 | 8/2006 | Popov | |
| 2006/0241967 A1 | 10/2006 | Gross | |
| 2006/0242269 A1 * | 10/2006 | Gross | ............................ 709/219 |
| 2007/0226295 A1 * | 9/2007 | Haruna et al. | ................ 709/204 |
| 2007/0276769 A1 * | 11/2007 | Claassen et al. | ................ 705/80 |
| 2009/0049556 A1 * | 2/2009 | Vrielink et al. | ................ 726/26 |
| 2009/0070437 A1 * | 3/2009 | Ruckart | ....................... 709/219 |

* cited by examiner

*Primary Examiner* — Firmin Backer
*Assistant Examiner* — Keyvan Emdadi
(74) *Attorney, Agent, or Firm* — Crose Law LLC; Bradley D. Crose

(57) ABSTRACT

The technology described herein provides systems and methods for the viral transfer of entertainment media with a "media exchange" established based on tools over the internet in a "buddy list," peer-to-peer, social networking environment, or the like, without utilizing a service provider's distribution system. Additionally, this technology provides tangible media exchange in a geographically local area, wherein the media exchange is prearranged based on the "buddy list," peer-to-peer, social networking environment, and so forth.

20 Claims, 4 Drawing Sheets

METHODS AND SYSTEMS TO MANAGE THE VIRAL TRANSFER OF RENTAL MEDIA

CROSS-REFERENCE TO RELATED APPLICATION(S)

The present non-provisional patent application claims the benefit of priority of U.S. Provisional Patent Application No. 60/971,320, which is entitled "METHODS AND SYSTEMS TO MANAGE THE VIRAL TRANSFER OF RENTAL MEDIA", which was filed on Sep. 11, 2007, and which is incorporated in full by reference herein.

FIELD OF THE INVENTION

The technology described herein relates generally to systems and methods for the transfer of media. More specifically, the technology described herein relates to systems and methods for the viral transfer of entertainment media with a media exchange established based on tools over the internet in a "buddy list," peer-to-peer, social networking environment, and so forth, without utilizing a service provider's distribution system. Furthermore, this technology relates to tangible media exchange in a geographically local area, wherein the media exchange is prearranged based on the "buddy list," peer-to-peer, social networking environment, and so forth.

BACKGROUND OF THE INVENTION

Entertainment media is a very large industry in which millions of users subscribe to various video and gaming rental services. As a result, millions of transactions involving the transfer of fees, media, etc. occur. Systems and methods for entertainment media transfer are known in the art. However, there are many deficiencies with these known systems. Such transactions are often very expensive and result in millions of dollars in sorting and shipping costs each year. Additionally, numerous delays exist in the occurrence of these transactions such that a user desiring a particular game or video must wait for availability. This environment forces service providers to continually seek methods to reduce costs while at the same time increase sales. Yet, while service providers are focused on reduced costs and increased sales, consumers are left desiring a quick, affordable method by which to receive and view rental media without unnecessary costs and time delays.

These and other problems exist. Previous attempts to solve these and other problems include the following.

U.S. Published Patent Application No. 2006/0241967, filed by Gross and published on Oct. 26, 2006, discloses a network based distribution system and method is disclosed for exchanging capacity between subscribers for distribution of playable media items, such as movies in a digital format. The system allows subscribers to exchange capacity directly between themselves, and/or to have such exchange performed automatically on their behalf.

U.S. Published Patent Application No. 2006/0149572, filed by Auzins et al. and published on Jul. 6, 2006, discloses a system providing for private coordination of the borrowing of items from an aggregate inventory contributed by system participants. A request is received from a system participant. The request is compared with item information associated with a universe of items maintained by the system to determine if a match for the requested title exists. If the requested item exists, a determination is made whether the item is available, whether the item owner is willing to lend it to the system participant and the relative priority of the request compared to other participant requests for the item. If approval is received, transportation of the item to the intended recipient is coordinated. The status of the item is monitored during the lending process to ensure efficient sharing of the item.

U.S. Published Patent Application No. 2004/0172275, filed by Gross and published on Sep. 2, 2004, discloses a network based distribution system and method for permitting subscribers to exchange playable media items, such as movies in a digital format. The exchange system includes a number of components that interoperate to improve a subscriber's experience, including an intelligent queue monitor which works on his/her behalf to identify potential items of interest for the subscriber. The system can thus automatically exchange for desirable titles, including other titles from other subscribers, under a set of programmed directives from the user, and/or in response to supply/demand requirements of other subscribers.

U.S. Published Patent Application No. 2004/0172274, filed by Gross and published on Sep. 2, 2004, discloses a network based distribution system and method for automatically exchanging playable media items, such as movies in a digital format. The automatic exchange system includes a number of components that interoperate to improve a subscriber's experience, including an intelligent queue monitor which works on his/her behalf to identify potential items of interest for the subscriber. The system can thus automatically exchange for desirable tides, including other titles from other subscribers, under a set of programmed directives from the user, and/or in response to supply/demand requirements of other subscribers.

U.S. Published Patent Application No. 2006/0020662, filed by Robinson and published on Jan. 26, 2006, discloses a that a computer associated with each of a potentially large number of end users is harnessed to provide a massively-distributed mechanism for finding the nearest neighbors of each user, according to tastes and/or interests. Once these nearest neighbors are determined, there taste or and/or interest profiles are leveraged for highly accurate recommendations, and their online addresses are leveraged for community purposes.

U.S. Published Patent Application No. 2006/0242269, filed by Gross and published on Oct. 26, 2006, discloses a hybrid distribution system and method for distributing/temporarily renting playable media items, such as movies in a digital format. The distribution system includes a first option in which a title is delivered in a ranking order identified by the subscriber and based on an allocation priority associated with the subscriber for such title. Alternatively the subscriber can be given a second option to gain access rights to the first title from a third party. In this manner a content provider can manage different types of demand through a combination of dedicated and third party inventory.

U.S. Published Patent Application No. 2006/0195913, filed by Popov and published on Aug. 31, 2006, discloses a method for the remote registration of a person's property rights over copyrighted media items. A remote registration of property rights over copyrighted media items is conducted by comparing the characteristic attributes of the person's items with the characteristic attributes of the items stored in the item database, by a system of a processing center, a means for the remote claiming of property, and a remote proof of ownership of media items. The remote registration is conducted on the person's property items, based on which the property rights over these items are acknowledged and benefits entitled to these property rights are granted to the owner. These benefits include, notably a transfer of a free digital copy of the media item protected by digital rights management (DRM) to the owner. The method enables a legal, fast and efficient transition of the media item ownership model from physical copy-based to digital copy-based, while recognizing each person's private property acquired to date and preventing harmful effects of mass digital copying, such as, proliferation of piracy. The method further enables a creation or an updating of a person's profile of preferences to facilitate further recommendations and sales of media items to the person.

U.S. Published Patent Application No. 2006/0149685, filed by Gross and published on Jul. 6, 2006, discloses a delivery mechanism for distributing media items to subscribers uses a timed based benchmark in lieu of or in addition to a conventional capacity driven model. In this manner, titles are delivered based on delays introduced intentionally and based on title demand, subscriber behavior, etc.

The foregoing patent and other information reflect the state of the art of which the inventors are aware and are tendered with a view toward discharging the inventors' acknowledged duty of candor in disclosing information that may be pertinent to the patentability of the technology described herein. It is respectfully stipulated, however, that the foregoing patent and other information do not teach or render obvious, singly or when considered in combination, the inventors' claimed invention.

BRIEF SUMMARY OF THE INVENTION

In various exemplary embodiments, the technology described herein provides systems and methods for the viral transfer of entertainment media with a "media exchange" established based on tools over the internet in a "buddy list," peer-to-peer, social networking environment, or the like, without utilizing a service provider's distribution system. Additionally, this technology provides tangible media exchange in a geographically local area, wherein the media exchange is prearranged based on the "buddy list," peer-to-peer, social networking environment, and so forth.

This technology described herein provides a system and method by which a subscriber of rental media such as DVDs, video games, or the like, exchanges titles in a geographically local area, bypassing the usual method of returning the media to a distribution center where it is sorted and sent back out to another subscriber.

The technology provides for the interaction of two or more subscribers in a "buddy list," peer-to-peer, social networking environment, or the like. Such interactivity provides access to a list of rental media that is assigned to a first subscriber. For example, the first subscriber creates a buddy list of other subscribers, or viewers, that have access to a list of rental media that is assigned to the first subscriber. The first subscriber rates, reviews, comments, or tags each of the titles the have ever been assigned by accessing a service provider website. The first subscriber can also forward title-related information to those on the buddy list or any other contact, thus contributing to the viral marketing nature. A second subscriber can view the buddy list and titles assigned to a friend, receive an e-mail message, and/or can search for titles near the second subscriber's locale. Regardless of how the second subscriber became aware of the title assigned to the first subscriber, the second subscriber can submit a request to acquire a title in the possession of the first subscriber via email, the service provider's website, instant message or other means for initiating such a request.

The technology provides that the service provider utilizes an approval system that would verify and approve such requests based on validated accounts, account status (new, maxed out rental titles, delinquent, etc.), fraud, title availability, title geographic distribution, marketing analysis, or other criteria known to those in the art. Once the service provider's approval system has approved the second subscriber's request, the request is forwarded to the first subscriber. The first subscriber can review the request and approve or disapprove the request based on the knowledge and familiarity of the second subscriber, status of use of the requested title, locale of the second subscriber, service provider incentives (dollars, points, upgrades, discounts, service level, promotions, subscriptions, etc.), second subscriber incentives (dollars, points, upgrades, discounts, service level, promotions, subscriptions, etc.), or any other consideration the first subscriber may have. If the request is not allowed, the first subscriber can send a message or reply to the request stating that the request is not approved. If the request is approved by the first subscriber, a message can be sent or replied to indicating the approval. The approval would be recorded by the service provider and sent to the second subscriber. The title has now been approved by all parties for "peer-to-peer" transfer bypassing the service provider's distribution system.

Once the title is approved for transfer, the first and second subscribers arrange for a convenient transfer time and place where the title will be transferred from the first subscriber to the second subscriber. Once the second subscriber has possession of the title, the first and second subscribers update the service provider's website that the transaction has successfully completed. The title is then confirmed in the assigned list to the second subscriber, and the process can be repeated to transfer the title to a third subscriber.

In the illustrative embodiment, this technology provides a system for the viral transfer of media, the system comprising: a service provider, the service provider having a plurality of media titles for selection and rental by a first subscriber; a catalog list, the catalog list containing media titles assigned to and in the current possession of the first subscriber, the catalog list being accessible on a communications network for accessibility and selective rental of at least one media title assigned to and in the current possession of the first subscriber by a second subscriber; and a means to approve a media exchange between the first and second subscribers without utilizing a distribution system of the service provider.

Advantageously, this technology provides systems and methods for the viral transfer of entertainment media with a "media exchange" established based on tools over the internet in a "buddy list," peer-to-peer, social networking environment, or the like, without utilizing a service provider's distribution system and its associated costs and time delays. Additionally, this technology provides a solution that harnesses the power of viral marketing and social networks. The technology also provides for increased sales and average return per unit (ARPU), lower acquisition costs, and lower transaction costs. Furthermore, this technology provides innovative viral marketing techniques to service providers, by using referrals from existing customers, and provides incentives to current and future subscribers. Also advantageous is that this technology only requires a convenient user interface such as website accessibility or an interactive voice response (IVR) systems.

There has thus been outlined, rather broadly, the more important features of the technology in order that the detailed description thereof that follows may be better understood, and in order that the present contribution to the art may be better appreciated. There are additional features of the technology that will be described hereinafter and which will form the subject matter of the claims appended hereto. In this respect, before explaining at least one embodiment of the technology in detail, it is to be understood that the invention is not limited in its application to the details of construction and to the arrangements of the components set forth in the following description or illustrated in the drawings. The technology described herein is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the technology described herein.

Further objects and advantages of the technology described herein will be apparent from the following detailed description of a presently preferred embodiment which is illustrated schematically in the accompanying drawings.

BRIEF DESCRIPTION OF THE DRAWINGS

The technology described herein is illustrated with reference to the various drawings, in which like reference numbers denote like system components and/or method steps, respectively, and in which.

DETAILED DESCRIPTION OF THE INVENTION

Before describing the disclosed embodiments of this technology in detail, it is to be understood that the technology is not limited in its application to the details of the particular arrangement shown here since the technology described is capable of other embodiments. Also, the terminology used herein is for the purpose of description and not of limitation.

In various exemplary embodiments, the technology described herein provides systems and methods for the viral transfer of entertainment media with a "media exchange" established based on tools over the internet in a "buddy list," peer-to-peer, social networking environment, or the like, without utilizing a service provider's distribution system. Additionally, this technology provides tangible media exchange in a geographically local area, wherein the media exchange is prearranged based on the "buddy list," peer-to-peer, social networking environment, or the like.

Figure 1:
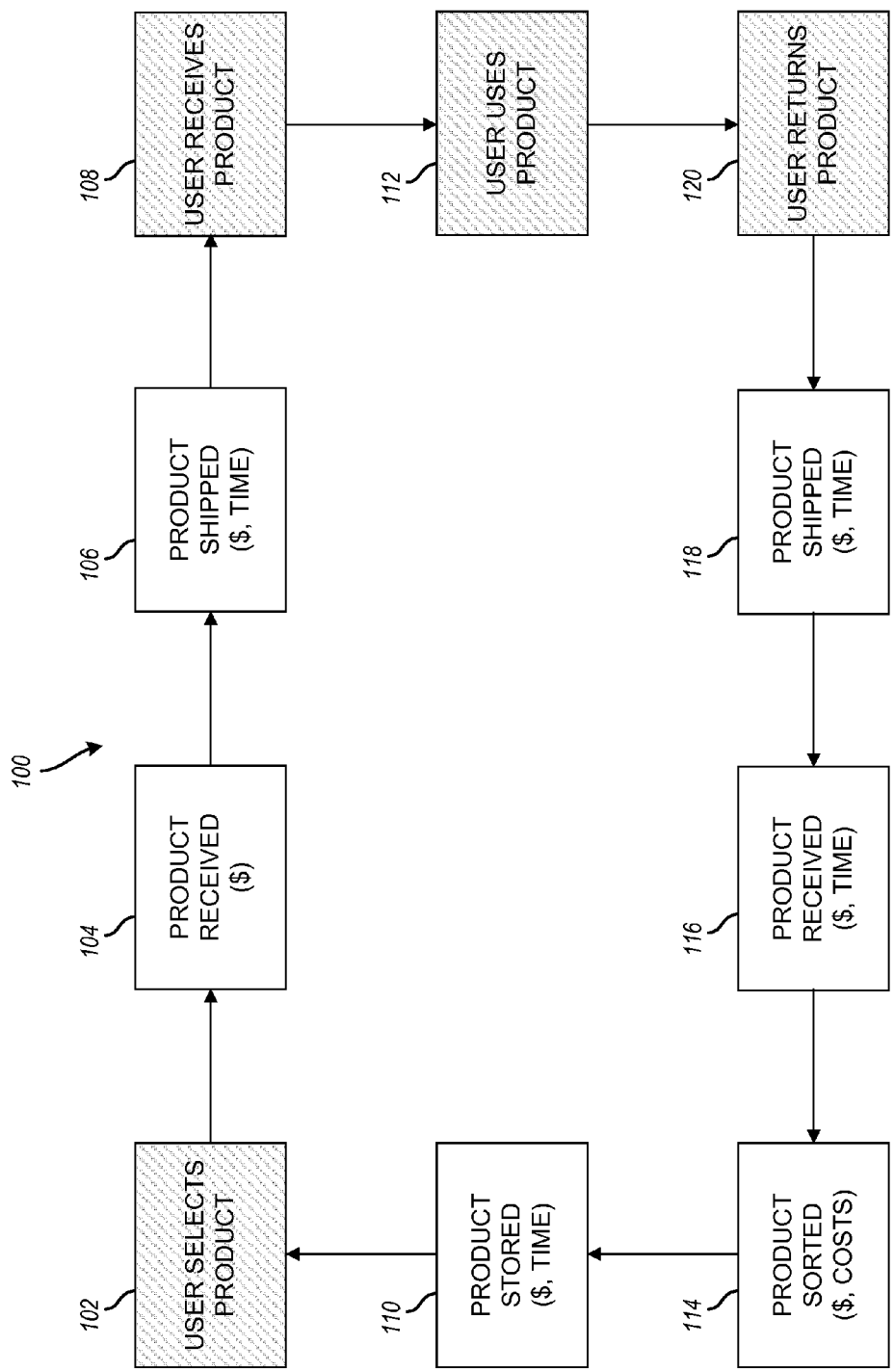
FIG. 1 (prior art) is a flowchart diagram illustrating a process known in the art for the distribution of rental media, illustrating, in particular, the significant time and costs associated with several cumbersome process steps.

Referring now to FIG. 1, a flowchart diagram 100 illustrating a process known in the art for the distribution of rental media is shown. A user selects a product in step 102 such as a video game or entertainment video for rental. This is, for example, illustrative of an online system for ordering movies to be delivered to a home address for viewing. The product is received by the user in step 104 only after preparation and packaging and their associated time and expense. The rental product is shipped in step 106, again only after time and expenses associated with shipping. Ultimately, a user receives the product in step 108, uses the product in step 112, such as views the movie, and returns the product in step 120. The return process is also cumbersome, time-consuming, and costly. The return product is shipped in step 118, received in step 116, sorted in step 114, and stored in step 110 for the next consumer. Each step in the return process adds both time delay and costs. This flowchart 100 is but one example of such systems already known in the art that add delay and cost into the rental transaction between a consumer and a service provider.

Figure 2:
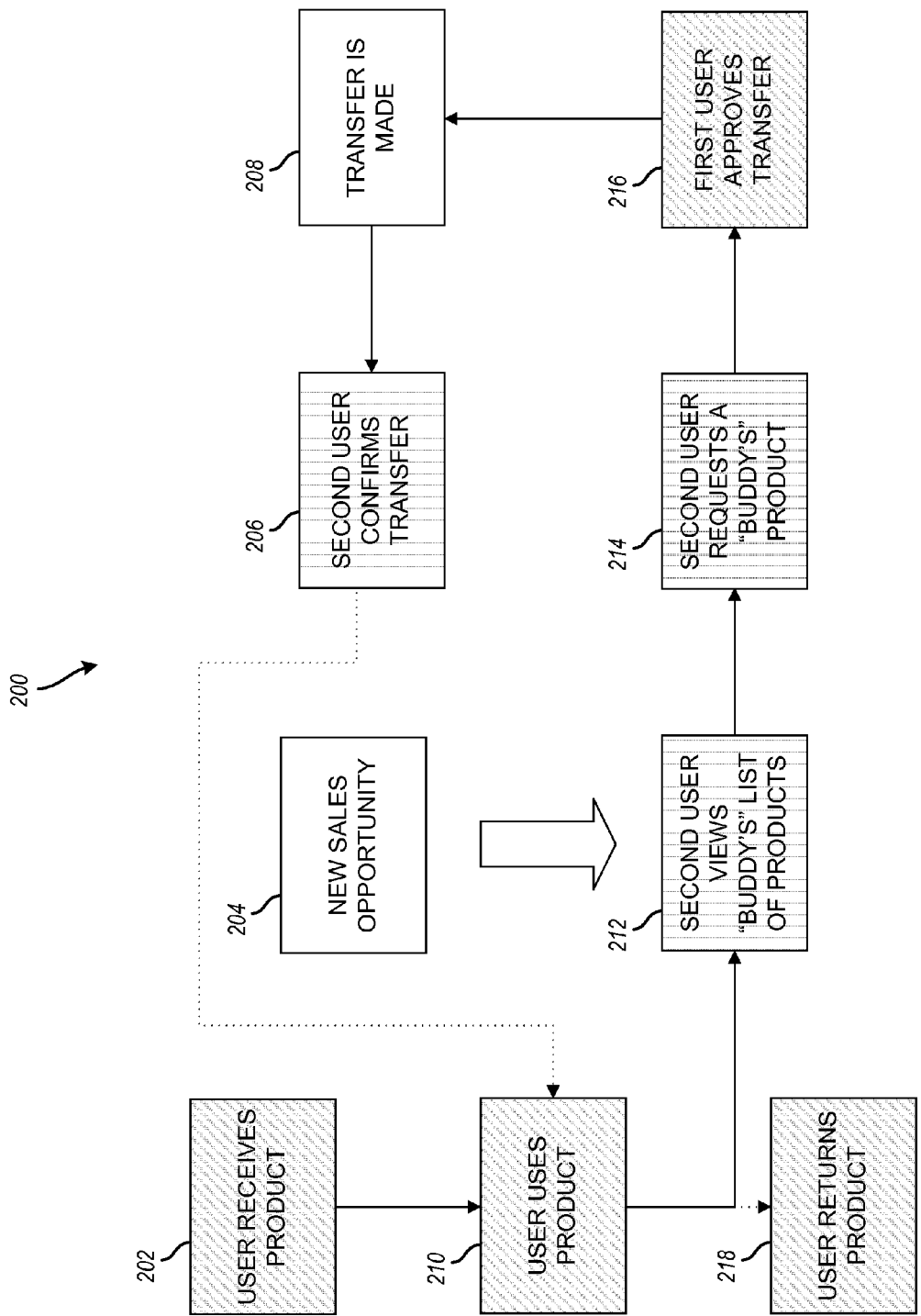
FIG. 2 is a flowchart diagram illustrating a process for the distribution of rental media utilizing viral transfer, illustrating, in particular, the interaction of multiple users seeking rental media.

Referring now to FIG. 2, a flowchart diagram 200 illustrating an improved process flow for the distribution of rental media utilizing viral transfer is shown. In one scenario, a first user receives a rental media product in step 202, such as a movie, video game, or the like, uses the product in step 210, and returns the product in step 218, similar to a traditional use of a rental product, as depicted in FIG. 1. However, as a first subscriber to a rental product, in step 202, the first subscriber, as a participant in a "buddy list," peer-to-peer, social networking environment, or the like, allows others to know of rental media in which he or she currently has possession, and thus create the possibilities for a new local sales opportunity in step 204.

Such interactivity provides access to a list of rental media that is assigned to a first subscriber. For example, the first subscriber creates a buddy list of other subscribers, or viewers, that have access to a list of rental media that is assigned to the first subscriber. The first subscriber rates, reviews, comments, and/or tags each of the titles the have ever been assigned by accessing a service provider website. The first subscriber can also forward title-related information to those on the buddy list or any other contact, thus contributing to the viral marketing nature.

Once the first subscriber creates a buddy list of other subscribers, or viewers, a second subscriber views the "buddy" list of available products in step 212. A second subscriber may view a plurality of "buddy" lists looking at a greater selection of possible rental media available in the geographical area from a "buddy." As the second user sees a listing for a product desired, the user sends a request in step 214 to obtain the rental media product from the first subscriber.

In one embodiment, the service provider utilizes an approval system that would verify and approve such requests in step 214 based on validated accounts, account status (new, maxed out rental titles, delinquent, etc.), fraud, title availability, title geographic distribution, marketing analysis, or other criteria known to those in the art. Once the service provider's approval system has approved the second subscriber's request from step 214, the request is forwarded to the first subscriber. The first subscriber can review the request and approve or disapprove the request in step 216 based on the knowledge and familiarity of the second subscriber, status of use of the requested title, locale of the second subscriber, service provider incentives (dollars, points, upgrades, discounts, service level, promotions, subscriptions, etc.), second subscriber incentives (dollars, points, upgrades, discounts, service level, promotions, subscriptions, etc.), or any other consideration the first subscriber may have. If the request is not allowed, the first subscriber can send a message or reply to the request stating that the request is not approved. If the request is approved by the first subscriber, a message can be sent or replied to indicating the approval. The approval would be recorded by the service provider and sent to the second subscriber. The title has now been approved by all parties for "peer-to-peer" transfer bypassing the service provider's distribution system.

Upon receipt of the second user request in step 214, the first subscriber approves the transfer in step 216. Once the title is approved for transfer, the first and second subscribers arrange for a convenient transfer time and place where the title will be transferred from the first subscriber to the second subscriber. A mutually agreed upon transfer time and location is determined and an actual transfer of the rental media is made in step 208. Once the second subscriber has possession of the title, the first and second subscribers update the service provider's website that the transaction has successfully completed. The second user confirms with the service provider that transfer has been made in step 206 and that the second user is now in possession of the rental media. The title is then confirmed in the assigned list to the second subscriber, and the process can be repeated to transfer the title to a third subscriber. The entire process 200 is completed without the utilizing a service provider's distribution system.

Figure 3:
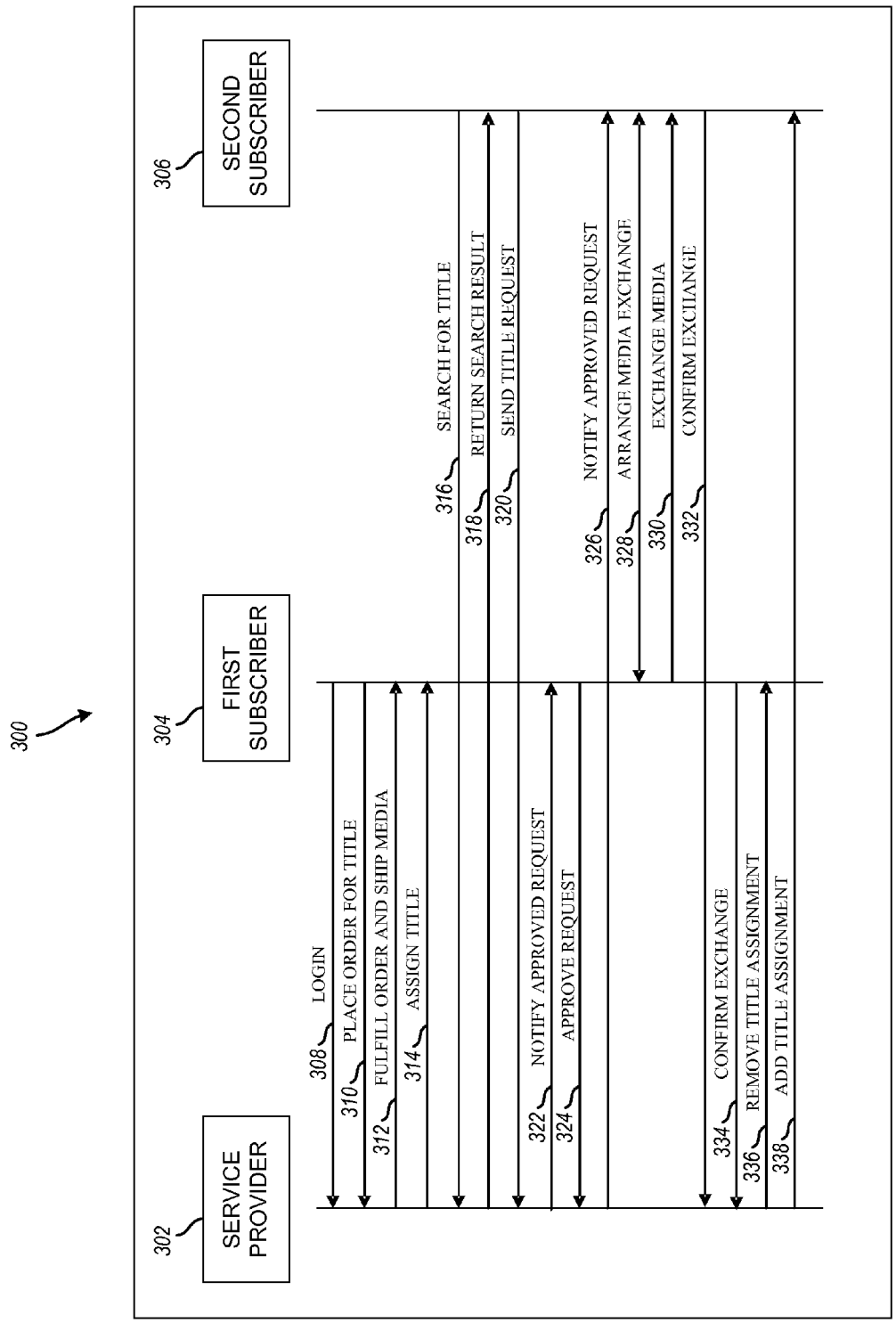
FIG. 3 is a flowchart diagram illustrating a process flow for the distribution of rental media utilizing viral transfer, illustrating, in particular, the interactivity between a service provider, first subscriber, and second subscriber.

Referring now to FIG. 3, a flowchart diagram 300 illustrating a process flow for the distribution of rental media utilizing viral transfer is shown. The viral transfer of rental media includes at least three parties. A service provider 302 owns the rental media and makes the media available for rental and shipment to a first subscriber 304. A second subscriber 306 does not have a direct relationship with the service provider 302, but is able to utilize products from the service provider 302 through the second subscriber's relationship with the first subscriber.

The relationship between the first and second subscribers 304, 306 may be established based on the utilization of tools over the internet in a "buddy list," peer-to-peer, social networking environment, and so forth. As such, the viral transfer of entertainment media is propagated and a media exchange is established without utilizing a service provider's distribution system.

The viral transfer of entertainment media is propagated and a media exchange established, for example, in the following steps: A first subscriber 304 provides a login in step 308 to a service provider 302. The first subscriber 304 places an order for a particular title of rental media desired in step 310 from the service provider 302. The service provider 302 fulfills the order and the media is shipped in step 312 to the first subscriber 304. The service provider 302 assigns the title to the first subscriber 304 in step 314. In step 316, a second subscriber 306, through use of a website or IVR system, is able to browse rental media, searching for a movie or video game title 306, of the service provider 302 that happens to be in possession of one or more first subscribers 304 located in the same geographical area. In step 318, the results of this search are returned to the second subscriber 306. In step 320, the second subscriber 306 then makes a selection based on titles available in the same geographical area and sends a title request.

A multipart approval process occurs. The service provider 302, after reviewing validated accounts, account status (e.g. new, maxed out rental titles, delinquent, etc.), fraud, title availability, title geographic distribution, marketing analysis, or other criteria known to those in the art, notifies a first subscriber 304 of the approval in step 322. The first subscriber 304 then approves, in step 324, the transaction request and informs the service provider 302 based on based on the knowledge and familiarity of the second subscriber, status of use of the requested title, locale of the second subscriber, service provider incentives (dollars, points, upgrades, discounts, service level, promotions, subscriptions, etc.), second subscriber incentives (dollars, points, upgrades, discounts, service level, promotions, subscriptions, etc.), or the like. The first subscriber 304 subsequently sends approval notification 326 to the second subscriber 306. The title has now been approved by all parties for "peer-to-peer" transfer bypassing the service provider's distribution system.

The second subscriber 306 and the first subscriber 304 arrange for a media exchange in step 328. A mutually agreed upon transfer time and location is determined and an actual transfer of the rental media is made in step 330. The second subscriber 306 is now in actual physical possession of the rental media product. The second subscriber 306 confirms, in step 332, the exchange with the service provider 302, insuring that the service provider 302 knows the location of the rental media product. The first subscriber 304 also confirms, in step 334, the exchange 330 that just took place with the service provider 302. The service provider 302 subsequently removes the title assignment in step 336 from the first subscriber 304 and adds the title assignment in step 338 to the second subscriber 306.

Figure 4:
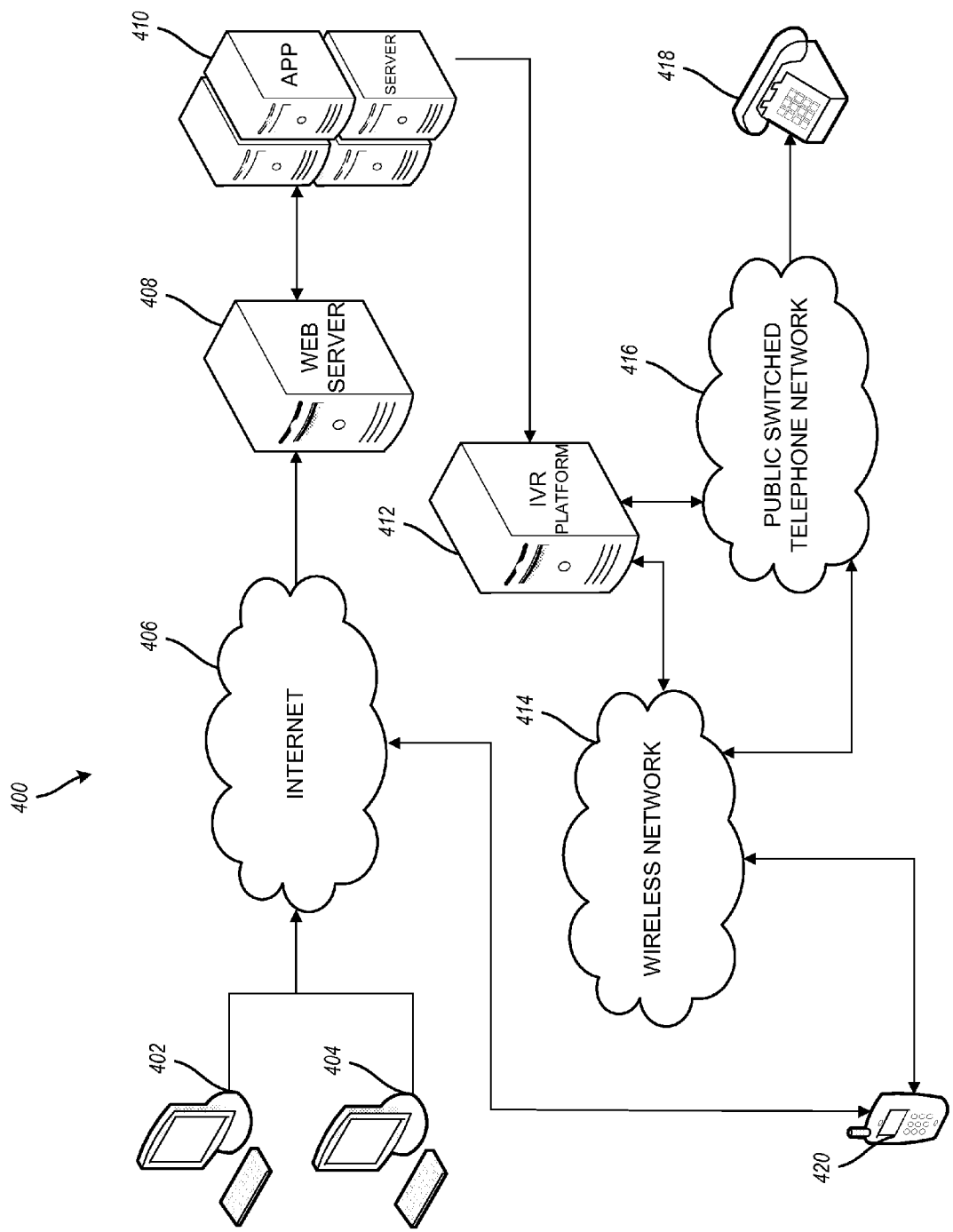
FIG. 4 is a system diagram for the distribution of rental media utilizing viral transfer, illustrating, in particular, various users and the system components each user to access rental media through the internet, wireless networks, and telephone networks.

Referring now to FIG. 4, a system diagram 400 for the distribution of rental media utilizing viral transfer is shown. The three parties minimally required for the viral transfer of rental media, a service provider 302, a first subscriber 304, and a second subscriber 306 (as depicted in FIG. 3), each may operate within the hardware and network infrastructure shown in system diagram 400.

PC-based users 402, 404 (or users of other similar web-accessible devices) and wireless users 420 access a service provider website through the internet 406. A service provider maintains, for example, a web server 408 and an application server 410 to manage the database of rental titles and the plurality of transactions between the service provider, first subscriber, second subscriber, on any other subscribers.

Wireless users 420 and land-line telephone users 418 can access information from a service provider by utilizing an internet voice response (IVR) platform 412. A wireless user 420 accesses the IVR platform 412 through a wireless network 414. A land-line telephone user 418 accesses the IVR platform 412 through a public switched telephone network 416. As will be appreciated by those skilled in the art, although the illustrative embodiment provides for wireless and land-line access, that some other embodiments of the technology described herein can employ other access methods such as for example, but not limited to, a voice over IP (VoIP) network, a virtual private network (VPN), and so forth, all of which can enable user and subscriber access to service provider information.

Thus, any user who can access the internet 406 or an IVR platform 412 are able to access the service provider web server 408 and application server 410 to review entertainment media titles available for rent in the same geographical area.

Although this technology has been illustrated and described herein with reference to preferred embodiments and specific examples thereof, it will be readily apparent to those of ordinary skill in the art that other embodiments and examples can perform similar functions and/or achieve like results. All such equivalent embodiments and examples are within the spirit and scope of the invention and are intended to be covered by the following claims.

What is claimed is:

1. A system for the viral transfer of media, the system comprising:
    a service provider, the service provider having a plurality of media titles for selection and rental by a first subscriber;
    a catalog list maintained by the service provider, the catalog list containing media titles assigned to and in the current physical possession of the first subscriber, the catalog list being accessible on a communications network for accessibility and selective rental of at least one media title assigned to and in the current physical possession of the first subscriber by a second subscriber;
    a means for a second subscriber to search and request one or more media titles from the catalog list containing media titles assigned to and in the current physical possession of the first subscriber;
    a means for the service provider to approve a physical media exchange between the first and second subscribers;
    a means for the first subscriber also to approve the physical media exchange between the first and second subscribers to place the second subscriber in current physical possession of the media title, without utilizing a distribution system of the service provider;
    a means for the service provider to notify the second subscriber that the first subscriber has approved the physical media exchange between the first and second subscribers;
    a means for the first subscriber to confirm to the service provider that the exchange that placed the second subscriber in physical possession has occurred; and
    a means for the second subscriber to confirm to the service provider that the exchange that placed the second subscriber in physical possession has occurred, thereby to inform the service provider of a location of the media title.

2. The system for the viral transfer of media of claim 1, further comprising:
    an application server, the application server configured to manage a database containing the plurality of media titles available for selection and rental and configured to manage a plurality of transactions between the service provider, first subscriber, and the second subscriber.

3. The system for the viral transfer of media of claim 2, further comprising:
    a network access server, the network access server configured to provide network communications access through the communications network for the first subscriber and the second subscriber to access the plurality of media titles of the service provider maintained on the application server and conduct transactions regarding the rental of media.

4. The system for the viral transfer of media of claim 2, further comprising:
    a voice response server, the voice response server configured to provide network communications access for the first subscriber and the second subscriber to access the plurality of media titles of the service provider maintained on the application server and to conduct transactions regarding the rental of media; and
    wherein access to the voice response server is made through a wireless communication network and at least one of the first and subscribers utilizes a wireless device.

5. The system for the viral transfer of media of claim 4, wherein access to the voice response server also is made through a telephone communication network and at least one of the first and subscribers utilizes a telephone.

6. The system for the viral transfer of media of claim 1, wherein the plurality of media titles comprises at least one of movie titles and video game titles.

7. The system for the viral transfer of media of claim 1, wherein the second subscriber accesses the catalog list through an online buddy list and selects at least one media title in the current possession of the first subscriber for rental and subsequent media exchange.

8. The system for the viral transfer of media of claim 1, wherein the second subscriber accesses the catalog list through a peer-to-peer based network and selects at least one media title in the current possession of the first subscriber for rental and subsequent media exchange.

9. The system for the viral transfer of media of claim 2, comprising:
    an approval system, the approval system managed by the service provider to verify and approve a plurality of requests for rental media by first and second subscribers; and
    wherein a plurality of data of the approval system is stored on the application server database.

10. A method for the viral transfer of media, the method comprising:
    maintaining, by a service provider, an accessible list of media titles available for selection and rental by a first subscriber;
    renting, by the first subscriber, one or more of the media titles;
    assigning the rented one or more media titles to the first subscriber;
    transferring the one or more rented media titles from the service provider to the first subscriber;
    creating a list of media titles assigned to and in the actual physical possession of the first subscriber;
    publishing, on a communication network, the list of media titles assigned to and in the current physical possession of the first subscriber such that a second subscriber selects a media title for rental and subsequent physical media transfer to the second subscriber;
    searching, by the second subscriber, and requesting one or more media titles from the catalog list containing media titles assigned to and in the current physical possession of the first subscriber;
    approving, by the service provider, a physical media transfer from the first subscriber to the second subscriber;
    approving by the first subscriber, also, the physical media exchange between the first and second subscribers;
    notifying by the service provider to the second subscriber that the first subscriber has approved the physical media exchange between the first and second subscribers;
    transferring the physical rented media titles from the first subscriber to the second subscriber, to place the second subscriber in current physical possession of the media title, without utilizing a distribution system of the service provider;
    confirming by the first subscriber to the service provider that the exchange that placed the second subscriber in physical possession has occurred; and
    confirming by the second subscriber to the service provider that the exchange that placed the second subscriber in physical possession has occurred, thereby to informing the service provider of a location of the media title.

11. The method for the viral transfer of media of claim 10, further comprising:
utilizing an application server;
configuring the application server to manage a database containing the plurality of media titles available for selection and rental; and
configuring the application server to manage a plurality of transactions between the service provider, the first subscriber, and the second subscriber.

12. The method for the viral transfer of media of claim 11, further comprising:
utilizing a network access server; and
configuring the network access server to provide network communications access through the communications network for the first subscriber and the second subscriber to access the plurality of media titles of the service provider maintained on the application server and conduct transactions regarding the rental of media.

13. The method for the viral transfer of media of claim 11, further comprising:
utilizing a voice response server;
configuring the voice response server to provide network communications access for the first subscriber and the second subscriber to access the plurality of media titles of the service provider maintained on the application server; and
configuring the voice response server to accept transactions regarding the rental of media.

14. The method for the viral transfer of media of claim 10, further comprising:
approving, by the service provider, a plurality of requests for rental media by first and second subscribers.

15. The method for the viral transfer of media of claim 10, further comprising:
approving, by the first subscriber, a request by the second subscriber to rent media from the list of media titles assigned to and in the possession of the first subscriber based upon knowledge and familiarity of the second subscriber to the first subscriber.

16. The method for the viral transfer of media of claim 10, further comprising:
creating incentives and rewards, by the service provider, to facilitate the return of media titles and continued participation in a program for the viral transfer of media.

17. The method for the viral transfer of media of claim 10, further comprising:
rating, reviewing, and tagging media titles, by the first subscriber, such that the ratings, reviews, and tags are included in the list of media titles assigned to and in the possession of the first subscriber that are available for subsequent review and rental access by a second subscriber before return of the rented media to the service provider.

18. The method for the viral transfer of media of claim 10, further comprising:
forwarding, by a first subscriber, the list of media titles assigned to and in the possession of the first subscriber through an online buddy list for selection by a second subscriber.

19. The method for the viral transfer of media of claim 10, further comprising:
forwarding, by a first subscriber, the list of media titles assigned to and in the possession of the first subscriber through a peer-to-peer based network for selection by a second subscriber.

20. A computer-implemented method for execution with computer code embodied on a tangible computer readable medium, for the viral transfer of media, the method comprising:
maintaining, by a service provider, an accessible list of media titles available for selection and rental by a first subscriber;
renting, by the first subscriber, one or more of the media titles;
assigning the rented one or more media titles to the first subscriber;
transferring the one or more rented media titles from the service provider to the first subscriber;
creating a list of media titles assigned to and in the current physical possession of the first subscriber;
publishing, on a communication network, the list of media titles assigned to and in the possession of the first subscriber such that a second subscriber selects a media title for rental and subsequent media transfer to the second subscriber;
searching, by the second subscriber, and requesting one or more media titles from the catalog list containing media titles assigned to and in the current physical possession of the first subscriber;
approving, by the service provider, a physical media transfer from the first subscriber to the second subscriber;
approving by the first subscriber, also, the physical media exchange between the first and second subscribers;
notifying by the service provider to the second subscriber that the first subscriber has approved the physical media exchange between the first and second subscribers;
transferring the physical rented media titles from the first subscriber to the second subscriber, to place the second subscriber in current physical possession of the media title, without utilizing a distribution system of the service provider;
confirming by the first subscriber to the service provider that the exchange that placed the second subscriber in physical possession has occurred; and
confirming by the second subscriber to the service provider that the exchange that placed the second subscriber in physical possession has occurred, thereby to informing the service provider of a location of the media title.

* * * * *